(12) United States Patent
Hou et al.

(10) Patent No.: US 6,901,051 B1
(45) Date of Patent: May 31, 2005

(54) SERVER-BASED NETWORK PERFORMANCE METRICS GENERATION SYSTEM AND METHOD

(75) Inventors: Yiwei Thomas Hou, Santa Clara, CA (US); Yingfei Dong, Eden Prairie, MN (US); Tomohiko Taniguchi, San Jose, CA (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/440,148

(22) Filed: Nov. 15, 1999

(51) Int. Cl.[7] ............................................. H04L 12/22
(52) U.S. Cl. ..................................... 370/231; 370/252
(58) Field of Search ................................ 370/229–231, 370/235–236, 252–253, 241–245, 247

(56) References Cited

U.S. PATENT DOCUMENTS

| | | | |
|---|---|---|---|
| 5,101,402 A | | 3/1992 | Chiu et al. ..................... 370/17 |
| 5,315,580 A | | 5/1994 | Phaal .......................... 370/13 |
| 5,375,070 A | | 12/1994 | Hershey et al. .............. 364/550 |
| 5,450,394 A | | 9/1995 | Gruber et al. ................. 370/17 |
| 5,485,455 A | * | 1/1996 | Dobbins |
| 5,521,907 A | | 5/1996 | Ennis, Jr. et al. ............. 370/17 |
| 5,787,253 A | | 7/1998 | McCreery et al. ..... 395/200.61 |
| 5,963,540 A | * | 10/1999 | Bhaskaran |
| 5,968,176 A | * | 10/1999 | Nessett |
| 6,067,572 A | * | 5/2000 | Jensen |
| 6,134,589 A | * | 10/2000 | Hultgren |
| 6,144,961 A | * | 11/2000 | de la Salle |
| 6,502,131 B1 | * | 12/2002 | Vaid et al. |

OTHER PUBLICATIONS (http://foldoc.doc.ic.ac.uk/foldoc/index.html).*
(Nahkimovsky, A. SIGCSE Bulletin Conference Title: SIGCSE Bull. (USA), vol. 30, No. 3 p. 297, Sep. 1998).*
(Fotsch, Edward) Healthcare Financial Management, pp. 30–31, Sep. 1996).*

Cisco Systems, Inc., NetFlow Services and Applications (White Paper), 1998, 12 pages, USA.

Cisco Systems, Inc., Service Level Management with Netsys: A Model–Based Approach (White Paper) 1998, 14 pages, USA.

Cisco Systems, Inc., CiscoAssure Policy Networking End-–to–End Qualty of Service (White Paper) 1998, 8 pages, USA.

Monk, Tracie, et al.; Internet Data Acquisition & Analysis: Status & Next Steps; Current Internet; University of California, San Diego/National Laboratory for Applied Research (NLANR) 14 pages; last updated Mar. 21, 1997; USA.

Paxson, Vern; Toward a Framework for Defining Internet Performance Metrics; Network Research Group, Lawrence Berkeley National Laboratory, 15 pages, USA.

* cited by examiner

*Primary Examiner*—Chi Pham
*Assistant Examiner*—Thai Hoang
(74) *Attorney, Agent, or Firm*—Christie Parker & Hale LLP (57) ABSTRACT

A method and system of generating performance metrics for network traffic being transferred in and out of an intranet. Network traffic is non-intrusively measured from a server to client perspective within periodic measurement time intervals. The network traffic is analyzed based on each connection made from a server to a client and the measurement time interval. Using the network traffic analyzed, performance metrics are generated. Accumulated performance metrics are also generated when a connection extends beyond a measurement time interval.

17 Claims, 5 Drawing Sheets

SERVER-BASED NETWORK PERFORMANCE METRICS GENERATION SYSTEM AND METHOD

BACKGROUND OF THE INVENTION

The present invention relates generally to network measurement systems and methods, and in particular to methods and systems of generating performance metrics for a predetermined network of servers.

A conventional network is made up of a plurality of network components or nodes, such as computing devices, e.g., personal computers, workstations and other similar devices. A limited number of network components and devices on a network spanning a relatively small area is called a local area network (LAN). In a LAN, most computing devices operate independently of each other, and most computing devices are able to access data or other network components anywhere on the LAN. A client system represents one such computing device.

The LAN allows for many client systems to share resources, such as printers or data storage equipment. A server is a managerial computing device that manages these shared network resources. Examples of servers include web servers that provide web pages, i.e., documents on the Internet or World Wide Web, file servers that are dedicated to storing and retrieving files from a storage device, and application servers that are dedicated to execute only specific types of applications, such as hardware or software development tools.

Interconnecting the client systems and the servers are a series of cables, such as twisted-pair cables, coaxial cables, or fiber optic cables, and network devices, such as routers, switches, and bridges. Conventionally, when a client system wants a task to be performed, it seeks a server to perform the task. Through the cables and network devices, the client system conveys its request to a server. If the server accepts the task, the server performs the task, and thereby transfers information to and from the client system. A server, however, does not have to be located in the same LAN as the client system.

One LAN can be connected to other LANs over great distances via telephone lines and radio waves. A collection of LANs connected in this manner is referred to as a wide-area network (WAN). A collection of WANs connected to other LANs and WANs is also referred to as a WAN. The largest WAN is the Internet, which is a global network connecting millions of computing devices. Therefore, client systems on a WAN are capable of accessing servers and client systems anywhere on the WAN.

However, in a WAN, the total number of client systems often greatly outnumbers the total number of servers. Therefore, a server may easily be bombarded by a tremendous number of client requests and thereby become overwhelmed. Performing and analyzing performance metrics on a LAN or WAN helps to quickly identify overwhelmed servers and to allow for corrective action. Similarly, other types of network issues such as inoperable cables or network devices, quality of service monitoring or server selection is identifiable and in some cases preventable by using network measurements.

In particular, server replication, a common technique, that has been used to provide scalable distributed services over the Internet would benefit greatly from the generation of performance metrics. Server replication, if done appropriately, avoids server overload, path congestion and significantly reduces client access latency. However, in order to select and process a client request so as to provide the "best service" for client systems, measurement of server loads and network performance is crucial and thus generation of performance metrics is invaluable.

However, generating performance metrics can be difficult due to the speed at which data is transferred. Also, collection and analysis of measured network traffic may be difficult for large networks having hundreds of computing devices and tremendous amounts of data being transferred to and from the computing devices. Furthermore, often techniques used to measure network traffic to generate performance metrics burden the network and thereby reduces the effectiveness of the particular network.

SUMMARY OF THE INVENTION

The present invention provides a system and method of generating performance metrics for a network of servers for an intranet, without extensively burdening the network. More specifically, a server-based measurement system and method to monitor server and network performance is provided for an enterprise network environment.

In one embodiment, a metrics server of an intranet is provided. The metrics server includes a network interface device configured to non-intrusively measure network traffic transferred in and out of the intranet for at least one connection. The at least one connection is a logical path from a specific source to a specific destination. In one embodiment, the specific source is the metrics server in the intranet and the specific destination is one of a plurality of clients outside the intranet or over the Internet. A processor is coupled to the network interface device and is configured to generate performance metrics for a predetermined measurement time interval using the measured network traffic for the at least one connection.

In another embodiment, a measurement infrastructure of an intranet is provided. The measurement infrastructure includes a plurality of clients outside the intranet and at least one server inside the intranet coupled to the plurality of clients. The measurement infrastructure also includes a metrics generator coupled to the at least one server. The metrics generator is configured to non-intrusively measure network traffic being transferred in and out of the intranet and to generate performance metrics from the measured network traffic.

In yet another embodiment, a method of generating network performance metrics is provided. The intranet includes at least one server. The method includes the steps of non-intrusively measuring network traffic between at least one server in the intranet and at least one client outside the intranet or over the Internet. The method also includes generating performance metrics from the network traffic measured between the at least one server and the at least one client within a predetermined measurement time interval.

Many of the attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

A particular of type of LAN or WAN is an intranet. Typically, an intranet is a LAN or WAN specifically configured for a specific business structure organization such as a corporation. An intranet operated and managed specifically for a business organization (enterprise) is often referred to as an enterprise computing system. In an enterprise network environment, replicated servers are often strategically deployed in geographically disperse locations to provide distributed services to a large number of client systems not only across the intranet, but also to client systems across the Internet. For example, replicated web servers are deployed to provide information services to client systems over the Internet. Therefore, typically, these replicated servers are connected via a WAN or intranet and the client systems on the Internet are provided access to the replicated servers via the Internet.

Generally, enterprise computing systems and intranets are much less expensive to build than other types of private networks based on proprietary protocols. Furthermore, the complexity of managing an intranet is often reduced due to limited authorized access and common administrative protocols. Therefore, a measurement infrastructure to generate performance metrics that is specifically directed to an intranet receives similar advantages of reduced cost and complexity.

Figure 1:
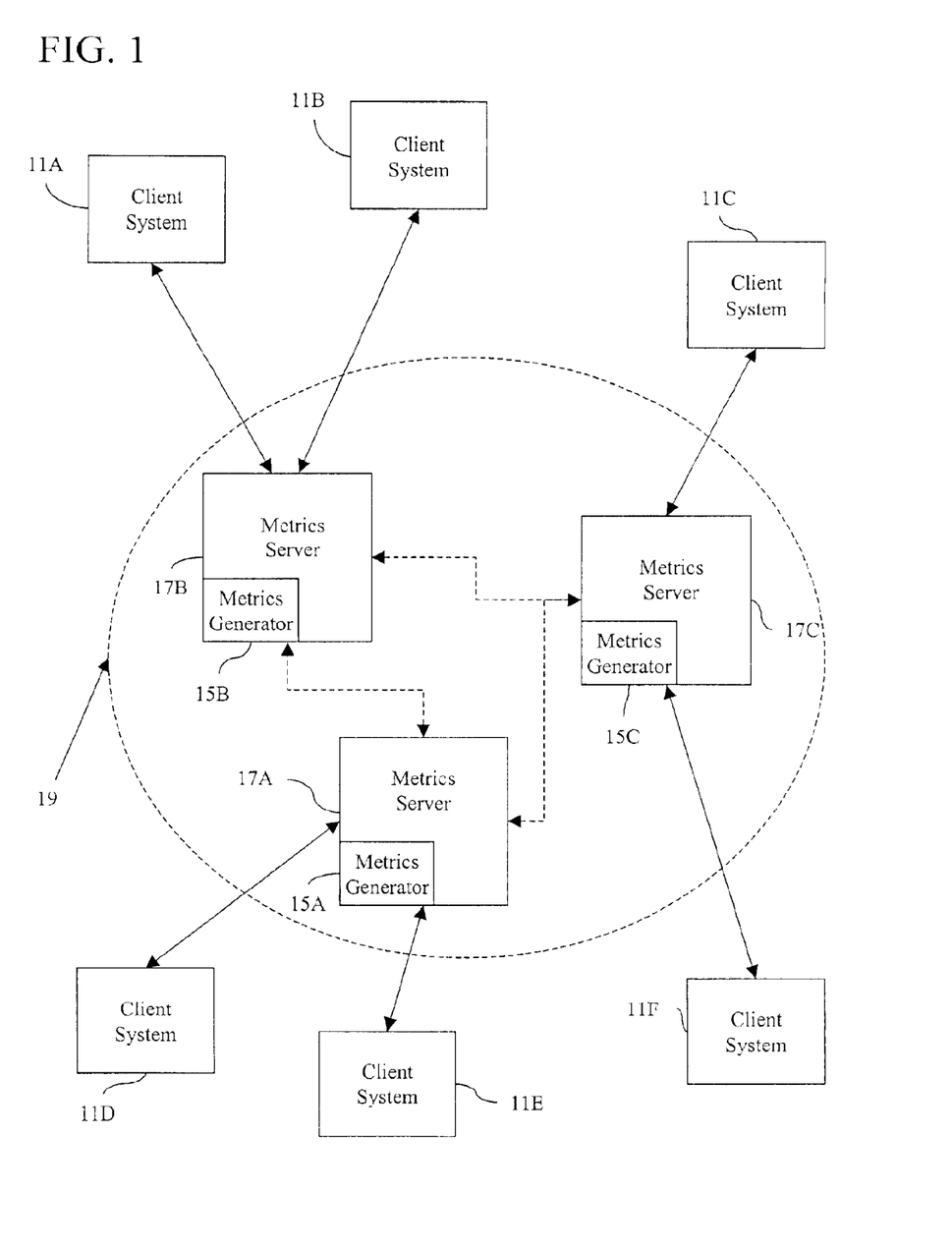
FIG. 1 illustrates a block diagram of an abstract model of a network having a measurement infrastructure of the present invention.

FIG. 1 illustrates an abstract model of a network including a measurement infrastructure of the present invention. The network 19 represents an intranet. FIG. 1 illustrates a plurality of computing devices. For illustrative purposes, the number of computing devices outside the intranet is limited, as it should be recognized that the number of computing devices outside the intranet may be exceedingly numerous. The computing devices in the network 19 include metrics servers 17A–17C. In the embodiment described, the metrics servers are interconnected through cables such as fiber optic cables or coaxial cables and are geographically located in different places. These metrics servers although are not in the same geographical location belong to the same business organization and thus belong to the same intranet. The metrics servers are also coupled to client systems 11A–11F. The client systems 11A–11F are outside the intranet, network 19. In other words, the client systems 11A –11F although coupled to the network are not considered part of the network. However, the client systems could be included or be inside other networks. These other networks include other intranets or enterprise computing systems within another business organization. Alternatively, these other networks include different network segments of the Internet.

In one embodiment, the metrics servers 17A–17C are "generic" servers such as web servers, application servers or file servers that are configured to generate performance metrics. In the embodiment described, the metrics servers are replicated web servers, i.e., web servers containing identical information or web pages, and the replicated web servers are configured with metrics generators 15A–15C. In one embodiment, the metrics generators 15A–15C are software programs able to generate performance metrics that is stored and executed by the metrics servers 17A–17C, respectively. In other embodiments, the metrics generators are hardware implementations fully hardwired for generating performance metrics or are hardware implementations including firmware for generating performance metrics. Also, although only three metrics servers are illustrated, the number of metric servers for a given network such as network 19, could vary.

With the metrics servers being "generic" servers that are configured with metrics generators to generate performance metrics, as described in the embodiment above, the performance measurements and generation are performed on the "server side". In other words, no additional or special hardware and/or software needs to be installed on the client systems or network devices, such as routers and switches. Therefore, the server-based measurement infrastructure can be readily deployed.

The metrics servers 17A–17C are configured to measure network traffic. Specifically, the metrics servers measure network traffic by determining the total number of data packets being transferred to the metrics servers from the client systems as well as from the metrics servers to the client systems. For example, in one embodiment, the metrics server 17A measures the total amount of data packets being transferred from client systems 11D–11E to the metrics server 17A. In addition, the metrics server measures the total amount of data packets being transferred to the client systems 11D–11E from the metrics server 17A.

In another embodiment, the metrics servers 17A–17C are dedicated metrics servers. Dedicated metrics servers are solely dedicated to generating performance metrics. These dedicated metrics servers are configured and positioned on the network as listening stations. As listening stations, the dedicated metrics servers examine all the data packets being transferred in and out of the entire intranet or portions of the intranet that traverses a specific measurement point. For example, when the metrics servers 17B is configured as a dedicated metrics server, the metrics server measures the total amount of data packets being transferred between the client systems 11A–11B and some or all the computing devices within the intranet.

In one embodiment, the metrics servers 17A–17C generate a predefined set of performance metrics. This set of performance metrics include path bandwidth, throughput, goodput, packet loss rate, and round trip delay. However, it should be recognized that other similar types of performance metrics than the set of performance metrics listed could also be generated.

Path bandwidth represents the minimal link or communication channel bandwidth among other links from a specific computing device to another specific computing device. Therefore, path bandwidth measures a fundamental physical limit or capacity for transferring data from one specific computing device to another specific computing device. For instance, path bandwidth is a measurement of the smallest bandwidth of the connection from metrics server 17B to client system 11A.

Throughput is a measurement of the total amount of data transferred from a specific computing device such as metrics server 17B to another specific computing device such as client system 11A through a particular connection between the two devices and measured over a predetermined time interval.

Goodput is related to throughput and measures the average amount of useful data transferred between a specific computing device to another specific computing device. Useful data is referred to as data packets being transferred along a specific communication channel that reaches its destination without having some of the data packets being dropped or lost and thus, necessitating the retransmission of the data packets. Packet loss rate is also related to goodput and throughput and measures the retransmission rate, i.e., the number of times required to retransmit data packets to have useful data transmitted along a specific communication channel. Since packet loss is often due to network congestion on a particular communication channel, packet loss rate often indicates the status of the network congestion for a particular communication channel.

Finally, round trip delay measures the total amount of time for a packet leaving a specific computing device such as metrics server 17A until an acknowledgment of the packet returns to the same specific computing device. Similar to packet loss rate, round trip delay is related to the network congestion on a particular communication channel. Hence, the round trip delay often indicates the status of the network congestion for the particular communication channel.

Referring back to FIG. 1, after measuring the network traffic and generating the performance metrics, in one embodiment, the performance metrics generated are provided to other metrics servers distributed throughout the intranet and thus establish a measurement infrastructure. In another embodiment, the metrics servers 17A–17C provide the performance metrics to a network load balancing system. One example of a network load balancing system is described in U.S. patent application Ser. No. 09/281,359, filed on Mar. 30, 1999, the disclosure of which is incorporated herein by reference as if set forth in full herein. In alternative embodiments, the performance metrics generated are provided to a user, such as a system administrator, or an automated system's management software for further analysis and examination to assist in managing the network or improving quality of service (QoS) monitoring. In yet another embodiment, the performance metrics generated are provided to file servers distributed throughout the network to store the performance metrics generated into a database for later comparison or compilation of network statistics.

Also, since the metrics servers are within an Intranet environment, the communication overhead of performance metrics exchange is easily limited and controlled. For instance, in comparison to the tremendous amount of network traffic transferred throughout the Internet, the amount of network traffic transferred in and out of the intranet is significantly less. By measuring a subset of the network traffic in and out of the intranet, i.e., measuring network traffic from a specific computing device to another specific computing device, the task of a metrics server to measure specific network traffic being transferred in and out of the intranet is significantly reduced.

Also, with the number of replicated servers in a single enterprise computing system being typically small, in order to provide performance metrics, the number of replicated servers configured with metrics generators is also small. Furthermore, for most applications (e.g., server selection or load balancing), generation of performance metrics on a sub-network basis, i.e., specific defined portions of the intranet, instead of on a per client application instance, or per host basis, is sufficient. Accordingly, a metric server is able to quickly measure network traffic and effectively generate and distribute performance metrics in a timely manner and without burdening the network.

Figure 2:
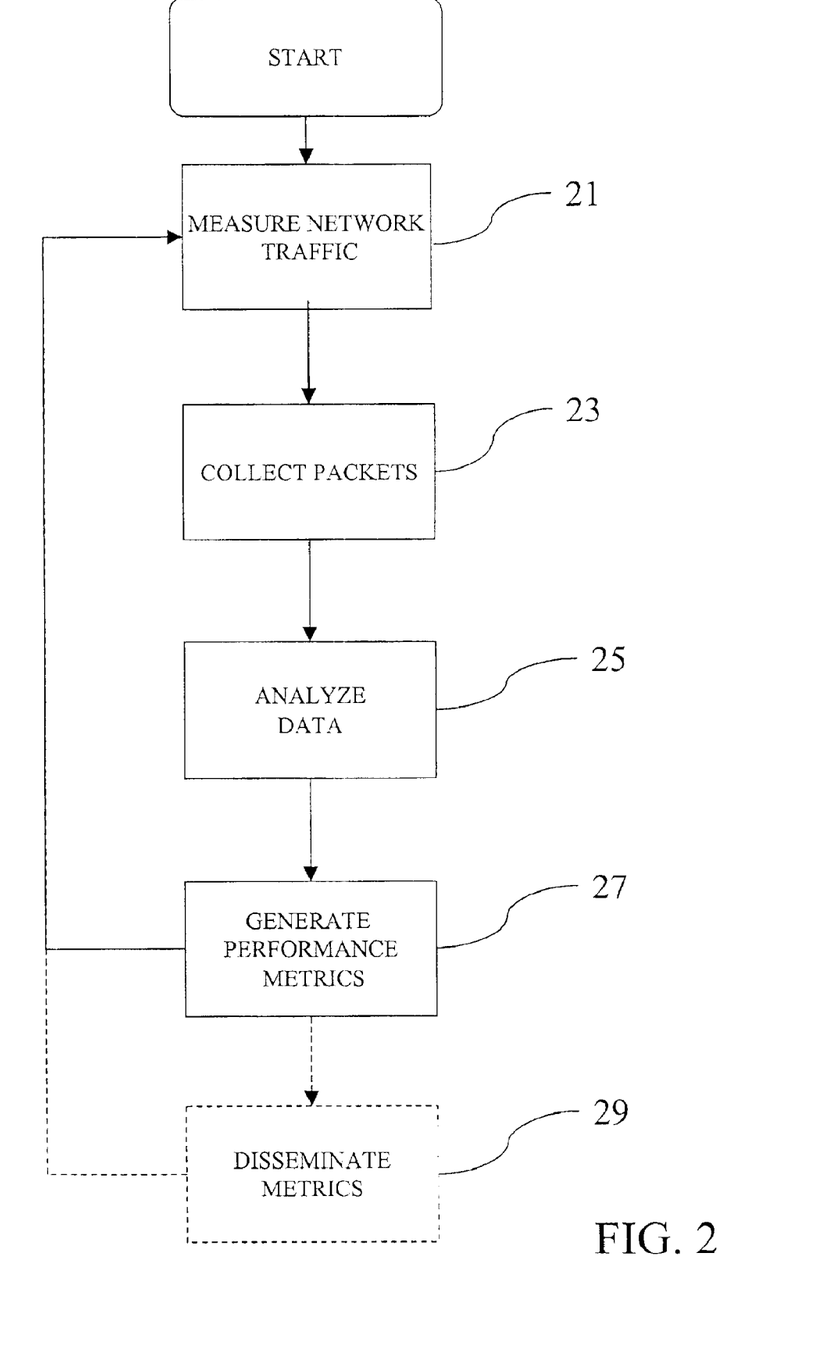
FIG. 2 illustrates a flow diagram of a process of an operational overview of an embodiment of a metrics server illustrated in FIG. 1.

FIG. 2 illustrates a flow diagram of a process of an operational overview of an embodiment of a metrics server illustrated in FIG. 1. In step 21, the process measures the network traffic being transferred in and out of a particular intranet. The common techniques for measuring network traffic in step 21 fall into two categories, non-intrusive measurements and intrusive measurements. Intrusive measurements or active probing requires the use of dummy or probing packets to perform measurements of the data traffic for the specific network. Probing packets are injected into the specific network in the same manner as other data packets being regularly introduced into the network by the numerous computing devices. The probing packets are then monitored and sometimes traced as the packets flow through the interconnections within the network.

By monitoring and tracing the probing packets, measurement of network traffic is fairly accurate and highly controllable by the device injecting the probing packet into the network. However, intrusive measurement techniques, by injecting and monitoring probing packets into a network, often introduces additional network overhead, i.e. burdens or reduces the capacity of data transferring throughout the specific network. The second category of techniques measuring network traffic is referred to non-intrusive measurement techniques.

Non-intrusive measurement techniques include passively monitoring the data packets being transferred to and from the computing devices within a particular network. No additional data packets need to be created or introduced into the network and thus, no or very little network overhead is introduced. However, non-intrusive measurements sometimes do not provide an accurate reading for the particular network. For instance, if non-intrusive measurements are obtained when a network is under used, i.e. data transfer between computing devices is limited, a reading of the network traffic when the network is severely loaded will not be conveyed. Similarly, non-intrusive measurement techniques do not provide highly controllable measuring of the network traffic for the particular network.

However, generating performance metrics using non-intrusive measurement techniques are very effective and do not introduce any additional burden to the network being measured. Furthermore, by isolating the measurements to a network metrics device or a particular server to perform the non-intrusive measurements any burden introduced into the network is further reduced and controllability of the non-intrusive network measurements is increased. Therefore, active probing based intrusive measurement techniques can be used only for those performance metrics that cannot be obtained through non-intrusive measurement. These performance metrics such as path bandwidth (i.e., the bottle neck link capacity along a path) are typically static, therefore intrusive measurement is only invoked occasionally. One example of a conventional intrusive measurement technique is described in M. Mathis et al., Diagnosing Intranet Congestion with a Transport Layer Performance Tool, proceedings at I-NET '96, Montreal, 1996, the disclosure of which is incorporated herein by reference. Therefore, the process is capable of minimizing the extra network load incurred by measurement traffic injected into the network.

Referring back to FIG. 2, in step 21, the process, in one embodiment, measures network traffic using both non-intrusive and intrusive measurement techniques. However, the intrusive measurement techniques are used to complement the non-intrusive measurements. In another embodiment, intrusive measurements are used during predetermined time intervals. Therefore, the intrusive measurements are used with significantly less frequency than the non-intrusive measurement techniques.

In the embodiment described of the process, in step 21, the non-intrusive measurement technique used requires the capturing of packets passively. The process passively captures the packets by copying data packets being transferred throughout the network. In another embodiment, the process passively captures and filters the packets by only copying selected portions of the data packets, such as header information, being transferred throughout the network. By selectively copying only the header information from the data packets, memory and performance requirements, as needed by the process, are significantly reduced. One example of packet capturing and filtering is disclosed in S. McCanne et al., the BSD Packet Filter, a New Architecture for User-Lever Packet Capture, proceedings at USENIX '93, San Diego, Calif. 1993, the disclosure of which is herein incorporated by reference. In another embodiment, the process uses a non-intrusive measurement technique that passively filters the data packets, i.e. selectively extracts portions of the data packets, without having to perform any copy operations.

In step 23, the process periodically collects the packets or the headers of the packets measured in step 21. In one embodiment, the process periodically collects the packets by using a static buffer. For example, the process, through an operating system of a metrics server, periodically stores packets in a static buffer residing in memory of the metric server, such that only packets intended for the metrics server and sent from the metric server are stored. Additionally, only the header portions of the packets are stored in the static buffer and any pre-existing packets in the static buffer are overwritten. In another embodiment, the process measures the network traffic in step 21 by using the operating system of a metrics server that is automatically configured to copy packets being transferred in and out of the intranet to dump files of the metrics server. The process then periodically collects the packets in step 21 by periodically copying the packets from the dump files to a static buffer.

Once the data packets have been measured and periodically collected in steps 21 and 23, the process analyzes the data packets in step 25. The process analyzes the data packets based on a predetermined measurement time interval and a specific connection or link which is active within the measurement time interval. The data packets analyzed in step 25 are then used in step 27 by the process to generate the performance metrics. Once the performance metrics have been generated in step 27, the process repeats starting at step 21. Both steps 25 and step 27 are discussed more fully below in reference with FIG. 3. The process ends when a predetermined condition or action from an external source occurs, such as a shutdown command from a system administrator or the removal of power from a metrics server.

In another embodiment, the process illustrated in FIG. 2 is extended to include step 29. In step 29, the process disseminates or shares the performance metrics generated with other metric servers or alternatively, a central database. The process then repeats starting at step 21, measuring network traffic. In one embodiment, the dissemination of performance metrics generated are distributed among other metric servers within the intranet such that each metric server contains a database of performance metrics for a portion of the subnets of the Internet. These distributive databases on each of the metric servers are periodically transferred, such as every minute.

In one embodiment, in order to reduce the amount of network traffic and processing bandwidth required for disseminating the performance metrics, only performance metrics that have been updated prior to the previous dissemination of performance metrics are transferred. In another embodiment, each metrics server on the network is configured, for example, through a configuration file, to selectively disseminate specific performance metrics such as packet loss rate. Similarly, the metrics server can be configured to receive selected performance metrics from other metrics servers. One example of performing the dissemination of information, such as the performance metrics generated by a metrics server, is described in M. T. Rose et al., How to Manage Your Network using SNMP, Princeton Hall, N.J., 1995, the disclosure of which is herein incorporation by reference.

Figure 3:
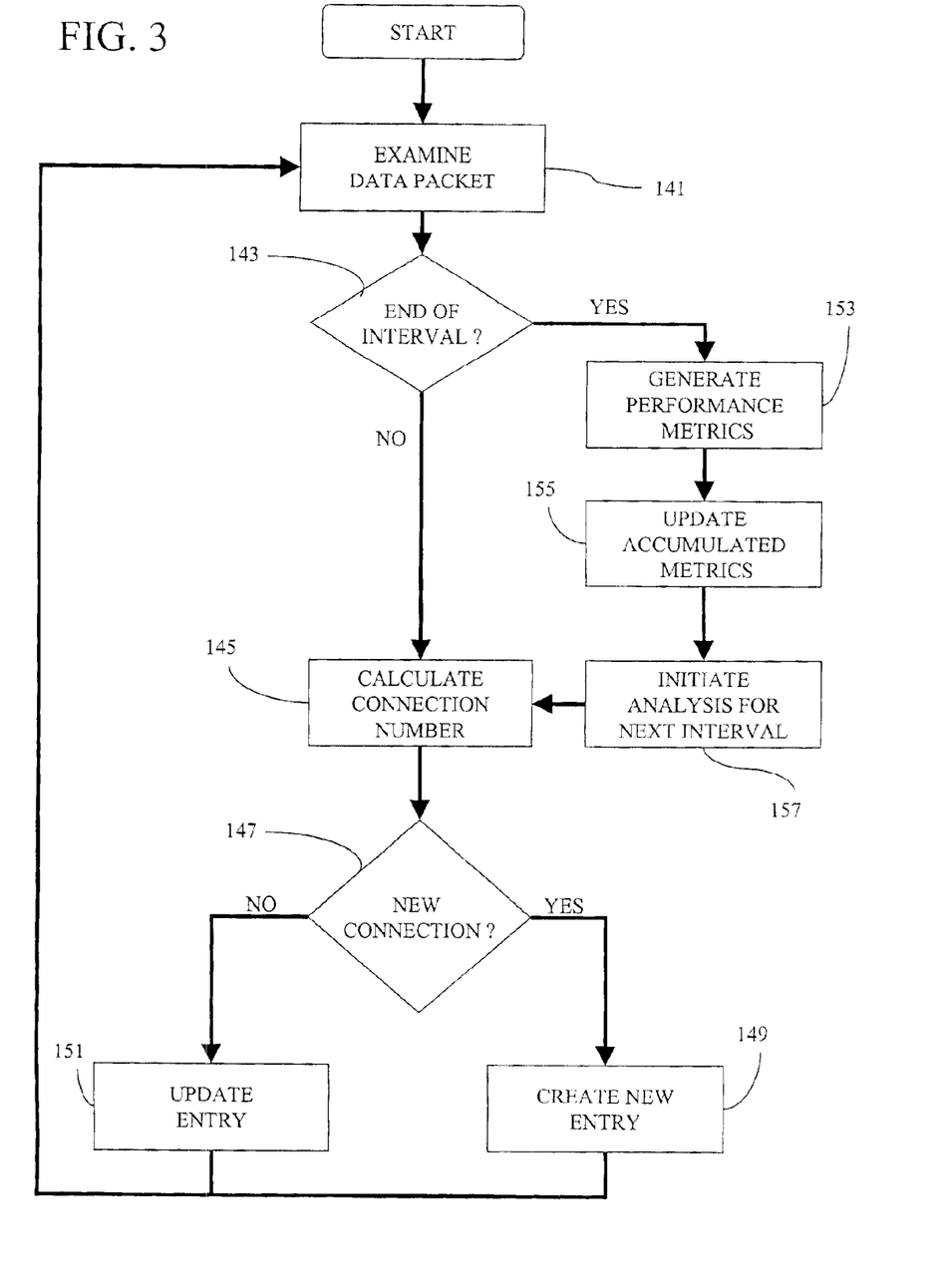
FIG. 3 illustrates a flow diagram of a process of the present invention of analyzing network traffic measured and generating performance metrics from the network traffic analyzed.

FIG. 3 illustrates a flow diagram of the detailed steps of steps 25 and 27 illustrated in FIG. 2. In step 141, the subprocess examines a data packet. In one embodiment, the subprocess examines only the header information in the data packet. The data packet is from the network traffic measured and collected in steps 21 and 23 of the process in FIG. 2. In one embodiment, the data packet is from a buffer and the subprocess reads or fetches the data packet from that buffer. The subprocess, in step 141, further examines the data packet for timestamp or timing information in comparison to a measurement time interval. In step 143, the subprocess determines if the timestamp of the data packet exceeds the measurement time interval, e.g., one minute.

If the timestamp of the packet does not exceed the measurement time interval, then the subprocess calculates a connection number in step 145. The subprocess calculates the connection number for the data packet by using the address information in the data packet. The address information include the Internet Protocol (IP) addresses for the source and destination of the data packet and the source and destination port numbers of the data packet. In one embodiment, a hash function is used based on the address information to compute the unique connection number.

The connection number calculated in step 145 uniquely identifies a specific connection for the data packet. A connection is referred to as a logical or physical communication path to be traversed or traversed by the data packet from one computing device, a source, to another computing device, a destination. In one embodiment, one of the computing devices is a metrics server. Hence, the address information in the data packet which provides source and destination information similarly defines a connection for the data packet.

In step 147, the subprocess compares the connection number with the unique connection numbers in an active connection table. The active connection table contains individual entries of unique connection numbers for each connection identified. If the connection number is not in the active connection table, then the subprocess in step 149 creates an entry in the active connection table. The entry created represents the new connection identified by the subprocess in step 147. If the subprocess in step 147 determines that the connection number is in the active connection table, then the subprocess in step 151 updates the active connection table with the calculated connection number.

Once the active connection table has been modified by step 149 or 151, the subprocess repeats, starting again at step 141. The subprocess continues while the process in FIG. 2 also continues, in parallel, to measure and periodically collect network traffic in steps 21 and 23. Therefore, the subprocess ends when the process in FIG. 2 ends.

Referring back to FIG. 3, if the timestamp of the packet exceeds the measurement time interval as determined by the subprocess in step 143, then the subprocess in step 153 generates performance metrics. The performance metrics generated are based on all the packets examined in step 141 except for the last packet that contained the timestamp which exceeded the measurement time interval. The performance metrics generated include path bandwidth, throughput, goodput, packet loss rate, and round trip delay. Furthermore, the performance metrics generated are the performance metrics for each connection identified and listed in the active connection table.

Once the subprocess generates the performance metrics in step 153, the subprocess generates the accumulated performance metrics in step 155. In one embodiment, the accumulated performance metrics are based on the performance metrics generated in step 153 and previous performance metrics generated in previous measurement time intervals. Once the accumulated performance metrics are generated by the subprocess in step 155, the subprocess continues to step 157. In step 157, the subprocess begins the analysis for the next measurement time interval and then continues to step 145. The generation and the determination to generate the accumulated performance metrics in step 155 and the determination to begin analysis for the next measurement time interval in step 157 by the subprocess is further described in reference to FIG. 4.

Figure 4:
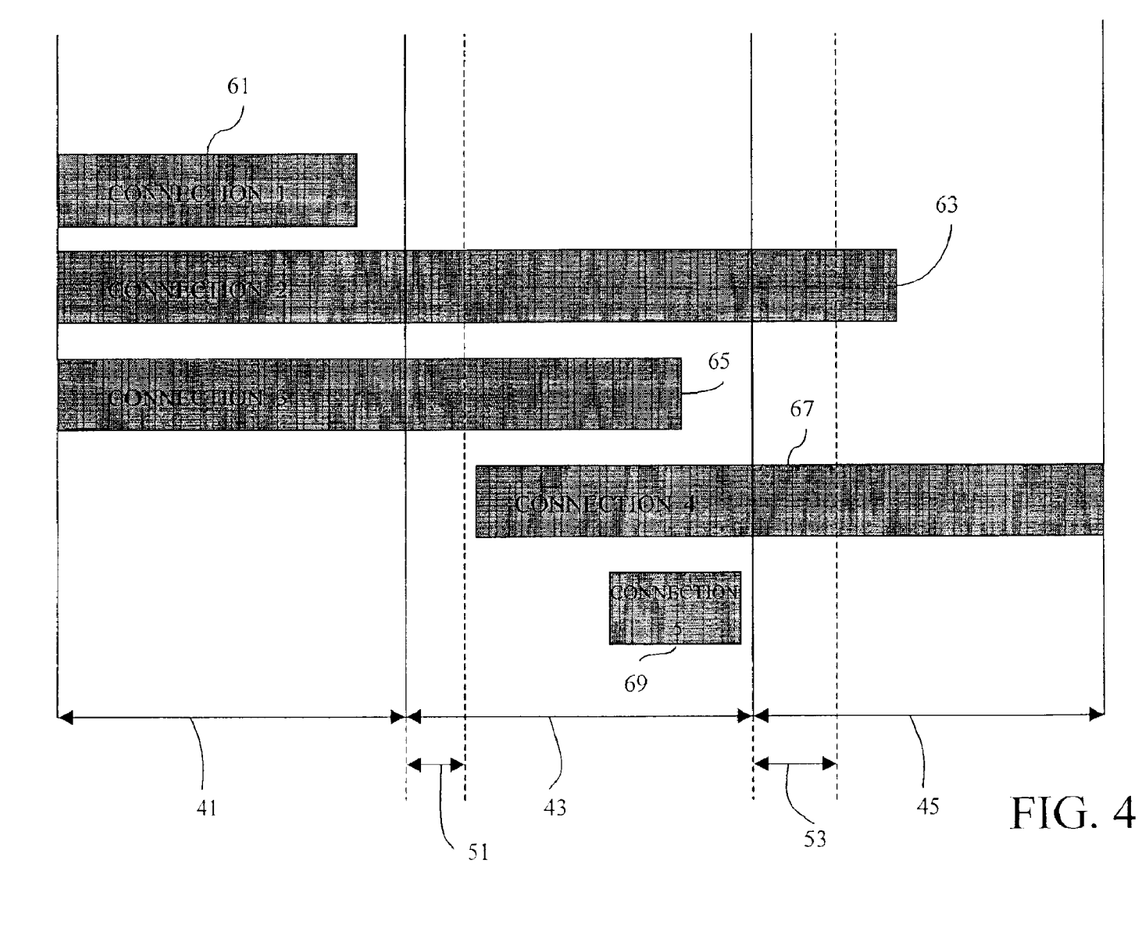
FIG. 4 illustrates a timing chart of the timing relationship between the processes illustrated in FIGS. 2 and 3 to the predetermined periodic measurement time intervals.

FIG. 4 illustrates a timing chart that graphically illustrates the timing relationship of the process and subprocess illustrated in FIGS. 2 and 3 to predetermined periodic measurement time intervals. In FIG. 4, three periodic measurement time intervals are shown, measurement time intervals 41, 43 and 45. Each measurement time interval 41, 43 and 45 represents a periodic time period in which data packets are measured, collected and analyzed. Generation time intervals 51 and 53 represent periodic time periods in which performance metrics are generated. Connection 1 time span 61 starts and ends within the measuring time interval 41. Connection 1 time span 61 graphically represents the establishment and termination of a connection from a specific computing device to another specific computer device.

Upon receiving a first packet for a connection 1, the active connection table is updated with the entry for connection 1 as described in steps 145, 147 and 149 in FIG. 3. Similarly, for connection 2 and 3 illustrated in FIG. 4 by connection 2 timespan 63 and connection 3 timespan 65, respectively, upon reading of a first packet for each connection, a new entry is created into the active connection table. Subsequent packets read from the buffer concerning connection 1, 2 or 3 causes the active connection table to be updated respectively for each connection. Table 1 illustrates the active connection table during the measurement time interval 41.

TABLE 1

| Connection Number |
|---|
| 1 |
| 2 |
| 3 |

When a packet from connection 2 is read after the measurement time interval 41 has passed, the generation of the performance metrics, as described in step 153 in FIG. 3, is initiated during the generation time interval 51. Since connection 1 timespan 61 does not extend past the measurement time interval 41, the current performance metrics for connection 1 is generated. In one embodiment, a new entry is added to a recently closed connection table. Similarly, the entry for connection 1 in the active connection table is removed. Hence, the recently closed connection table is similar to the active connection table. Both tables contain connection numbers, however, the connection numbers in the recently closed connection table are unique numbers of connections that have terminated. For example, the entry for connection 1 in the recently closed connection table represents the closing or termination of connection 1. All entries added into the recently closed connection has a limited life span. In other words, entries within the recently closed connection tables remain for a predetermined time period $T_{max}$. The predetermined time period $T_{max}$, in one embodiment, is thirty minutes.

Furthermore, during the generation time interval 51, current performance metrics are generated for connections 2 and 3, similar to the performance metrics generated for connection 1. However, as connection 2 and 3 time spans 63 and 65 extend past the measurement time interval 41, accumulated performance metrics are generated. Accumulated performance metrics generated include the performance metrics generated for the current measurement time interval, such as measurement time interval 41 and any proceeding measurement time interval in which the connection is active. For instance, in FIG. 4, connection 2 timespan 63 extends through measurement time intervals 41 and 43 and into measurement time interval 45. Connection 2 terminates in measurement time interval 45. Therefore, accumulated performance metrics for connection 2 includes the performance metrics generated and accumulated during the measurement time intervals 41, 43 and 45. Likewise, the accumulated performance metrics generated for connection 3 includes the performance metrics generated and accumulated during the measurement time intervals 41 and 43.

Along with the accumulated performance metrics being generated, an accumulated elapsed time is also recorded. The accumulated elapsed time represents a time period. The time period is delimited by a start time which is when a first packet initiates the connection and an end time which is when a last packet is measured and collected from the same connection.

In FIG. 4, connection 4 timespan 67 represents connection 4 starting within the measurement time interval 43 and ending in the measurement time interval 45. Similar to connections 2 and 3, current performance metrics and accumulated performance metrics are generated for connection 4. However, since connection 4 began during measurement time interval 43, current performance metrics and accumulated performance metrics generated are for the measurement time intervals 43 and 45. Connection 5 timespan 69 in FIG. 4 starts and terminates within the measurement time interval 43. Hence, similar to connection 1, current performance metrics is generated for connection 5. However, since connection 5 begins and ends during measurement time interval 43, the performance metrics generated are for measurement time interval 43 only. Table 2 illustrates the active connection table during the measurement time interval 43.

TABLE 2

| Connection Number |
| --- |
| 2 |
| 3 |
| 4 |
| 5 |

Similarly, table 3 illustrates the active connection table during the measurement time interval 45.

TABLE 3

| Connection Number |
| --- |
| 2 |
| 4 |

Furthermore, since some connections may not terminate, i.e., generate a packet signifying the termination of the connection, in any measurement time interval due to a network error, in one embodiment, a keep alive time value $T_{alive}$ is maintained. In one embodiment, the time value $T_{alive}$ is two hours. For example, connection 1 in FIG. 4 is initiated during a specific measurement time interval, measurement time interval 41. If subsequent data packets are not examined or measured from the connection 1 for a time period that exceeds the $T_{alive}$ value, the connection is determined to be invalid or lost. Therefore, the entry for the connection in the active connection table is removed. If a subsequent data packet for the same connection is received, then an entry will be created and added to the connection table as a new connection.

In addition to the performance metrics generated during each measurement time interval, in one embodiment, frequently visited subnets are also recorded. The address information included in the headers of the packets for a particular connection are examined. From this address information subnet information is extracted. Subnet information includes the IP address of a specific portion of a particular network within the larger network or Internet. Also, a predetermined frequency threshold is maintained such as thirty contacts. Using this frequency threshold, when the total number of connections having packets containing specific subnet information exceeds the frequency threshold value, the subnet is recorded as a frequently visited subnet table.

Figure 5:
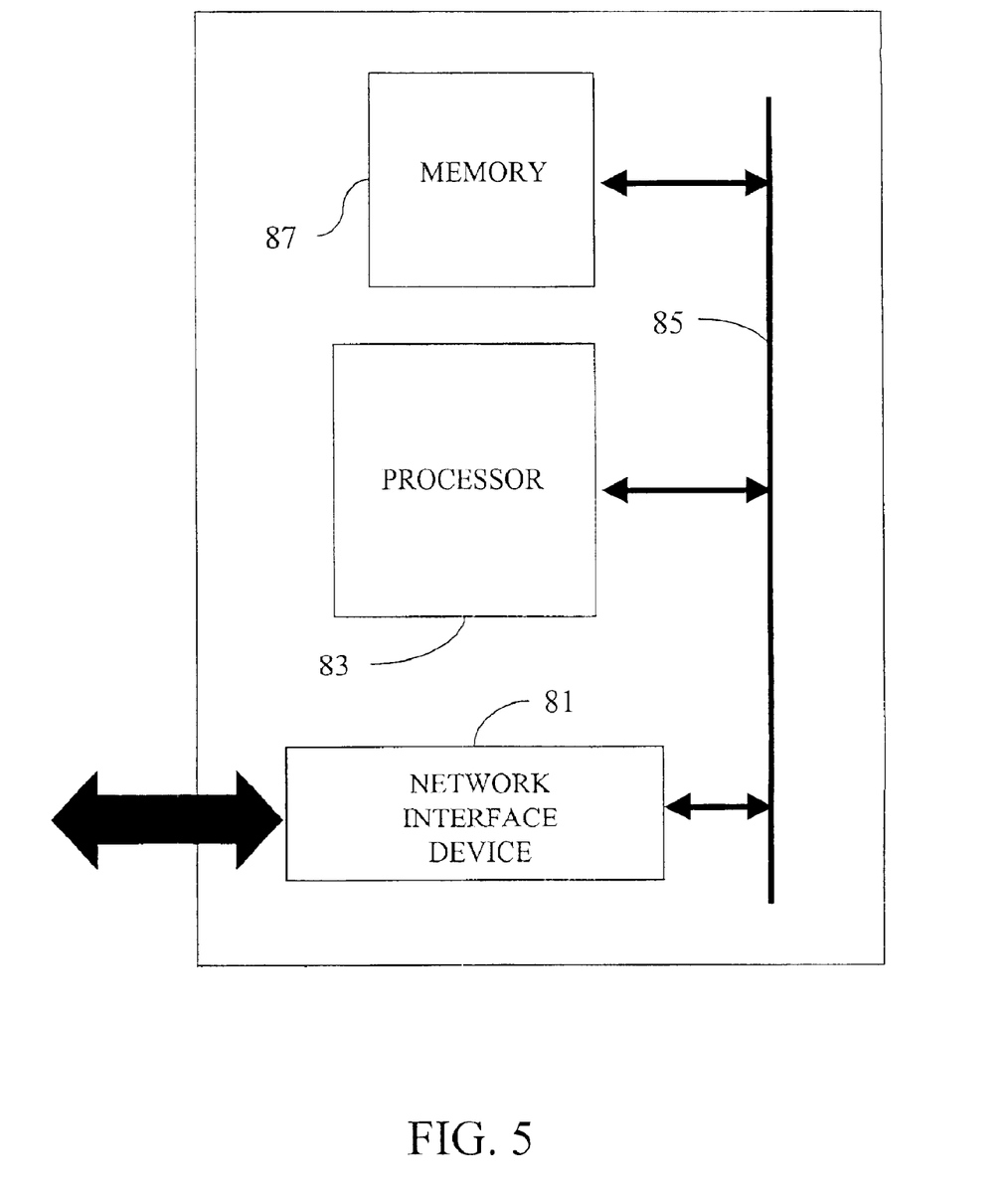
FIG. 5 illustrates a block diagram of one embodiment of the metrics server of the present invention.

FIG. 5 illustrates a block diagram of one embodiment of the metrics server of the present invention. In one embodiment, the metrics network device is a stand-alone device. The metrics network device receives data packets transferred through a particular network from the network interface device 81. The network interface device 81 is configured to selectively capture and filter the data packets received. Once these data packets have been received and filtered, the data packets are stored in memory, i.e. memory buffer 87. A processor 83, coupled to the memory buffer 87 and the network interface device 81 through a path 85, examines the packets stored in memory buffer 87. The path 85, in one embodiment, is a bus and in another embodiment is a switch. The processor 83 is configured to generate the performance metrics based on the packets stored in the memory buffer 87.

In one embodiment, the processor 83 is configured to execute the process illustrated in FIGS. 2 and 3. Specifically, the processor 83 is configured to execute the steps 25, 27 and 29 of the process in FIG. 2 and the subprocess illustrated in FIG. 3. The network interface device 81 is also configured, in one embodiment, to execute the steps 21 and/or 23 in FIG. 2 to measure and collect the data packets being transferred to and from the metrics server to client systems. The memory buffer 87 is also utilized, in one embodiment, in the execution of step 23 in FIG. 2 to store the data packets. The memory buffer 87 also stores the various tables used such as the active connection table, frequently visited subnet table and the recently closed connection table. In one embodiment, the memory buffer 87 also stores the various variables such as $T_{alive}$ and $T_{max}$.

Accordingly, the present invention provides a metrics server and a method of generating performance metrics for network traffic being transferred in and out of an intranet. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A metrics server in an intranet comprising:

a network interface device configured to non-intrusively measure network traffic transferred in and out of an intranet for at least one connection, the at least one connection being a logical path from a specific source to a specific destination, the intranet being a network accessible only by authorized users;

a processor coupled to the network interface device and configured to generate performance metrics for a predetermined measurement time interval using the measured network traffic for the at least one connection;

wherein the at least one connection is delimited by a first packet from the specific source to the specific destination and a last packet from the specific source to the specific destination;

wherein the specific source is identified by a source Internet Protocol address in the first packet and the specific destination is identified by a destination Internet Protocol address in the first packet for the at least one connection;

wherein the network interface device is further configured to filter the measured network traffic such that only header information contained within the packets being transferred are captured by the network interface device;

further comprising a memory coupled to the network interface device and the memory stores the measured network traffic;

wherein the memory further stores an active connection table containing entries for the at least one connection that is active during the predetermined measurement time interval and an entry is deleted from memory when the at least one connection for the entry is inactive when the predetermined measurement time interval expires; and wherein the processor is further configured to update the active connection table based on the measured network traffic and the predetermined measurement time interval.

2. The metrics server of claim 1 wherein the processor is further configured to accumulate the performance metrics generated for the at least one connection that extends pass the predetermined measurement time interval.

3. The metrics server of claim 2 wherein the processor configured to generate performance metrics includes the determination of source and destination Internet Protocol addresses and timestamp information of the packets captured within the predetermined measurement time interval.

4. A metrics server in an intranet comprising:
- a network interface device configured to non-intrusively measure network traffic transferred in and out of an intranet for at least one connection, the at least one connection being a logical path from a specific source to a specific destination;
- a processor coupled to the network interface device and configured to generate performance metrics for a predetermined measurement time interval using the measured network traffic for the at least one connection;
- wherein the at least one connection is delimited by a first packet from the specific source to the specific destination and a last packet from the specific source to the specific destination;
- wherein the specific source is identified by a source Internet Protocol address in the first packet and the specific destination is identified by a destination Internet Protocol address in the first packet for the at least one connection;
- wherein the specific source is the metrics server and the specific destination is at least one client outside the intranet and the measured network traffic includes packets being transferred between the metrics server and the at least one client;
- wherein the network interface device is further configured to filter the measured network traffic such that only header information contained within the packets being transferred are captured by the network interface device;
- a memory coupled to the network interface device and the memory stores the measured network traffic;
- wherein the memory further stores an active connection table containing entries for the at least one connection that is active during the predetermined measurement time interval;
- wherein the processor is further configured to update the active connection table based on the measured network traffic and the predetermined measurement time interval;
- wherein the processor is further configured to accumulate the performance metrics generated for the at least one connection that extends pass the predetermined measurement time interval;
- wherein the processor configured to generate performance metrics includes the determination of source and destination Internet Protocol addresses and timestamp information of the packets captured within the predetermined measurement time interval; and
- wherein the predetermined measurement time interval is one minute.

5. The metrics server of claim 4 wherein the network interface device is further configured to intrusively measure network traffic transferred in and out of the intranet for the at least one connection for the generation of a specific performance metric.

6. A measurement infrastructure comprising:
- a plurality of clients outside an intranet, the intranet being a network accessible only by authorized users;
- a first metrics server inside the intranet coupled to the plurality of clients and configured to non-intrusively measure network traffic being transferred in and out of the intranet and to generate performance metrics based on the network traffic measured;
- wherein the network traffic measured by the first metrics server includes packets being transferred for at least one first connection, the at least one first connection being a logical path from the first metrics server to one of the plurality of clients outside the intranet;
- wherein the performance metrics generated by the first metrics server is for a predetermined measurement time interval using the measured network traffic for the at least one first connection;
- further comprising a second metrics server that is configured to non-intrusively measure network traffic being transferred in and out of the intranet and to generate performance metrics based on the network traffic measured;
- wherein the network traffic measured by the second metrics server includes packets being transferred for at least one second connection, the at least one second connection being a logical path from the second metrics server to one of the plurality of clients outside the intranet;
- wherein the performance metrics generated by the second metrics server is for a predetermined measurement time interval using the measured network traffic for the at least one second connection; and
- wherein the first metrics server distributes performance metrics generated by the first metrics server to the second metrics server in the intranet.

7. The measurement infrastructure of claim 6 wherein the second metrics server distributes performance metrics generated by the second metrics server to the first metrics server in the intranet.

8. The measurement infrastructure of claim 7 wherein the performance metrics generated by the first and second metrics servers are distributed on a predetermined periodic basis.

9. A measurement infrastructure comprising a plurality of clients outside an intranet;
- a first metrics server inside the intranet coupled to the plurality of clients and configured to non-intrusively measure network traffic being transferred in and out of the intranet and to generate performance metrics based on the network traffic measured;
- wherein the network traffic measured by the first metrics server includes packets being transferred for at least one first connection, the at least one first connection being a logical path from the first metrics server to one of the plurality of clients outside the intranet;
- wherein the performance metrics generated by the first metrics server is for a predetermined measurement time interval using the measured network traffic for the at least one first connection;
- a second metrics server that is configured to non-intrusively measure network traffic being transferred in and out of the intranet and to generate performance metrics based on the network traffic measured;
- wherein the network traffic measured by the second metrics server includes packets being transferred for at least one second connection, the at least one second connection being a logical path from the second metrics server to one of the plurality of clients outside the intranet;
- wherein the performance metrics generated by the second metrics server is for a predetermined measurement time interval using the measured network traffic for the at least one second connection;

wherein the first metrics server distributes performance metrics generated by the first metrics server to the second metrics server in the intranet;

wherein the second metrics server distributes performance metrics generated by the second metrics server to the first metrics server in the intranet; and wherein the distributed performance metrics includes only the performance metrics generated by the first metrics server and the second metrics server that are different from any previously distributed performance metrics by the first metrics server and the second metrics server.

10. A measurement infrastructure comprising:

a plurality of clients outside an intranet;

a first metrics server inside the intranet coupled to the plurality of clients and configured to non-intrusively measure network traffic being transferred in and out of the intranet and to generate performance metrics based on the network traffic measured;

wherein the network traffic measured by the first metrics server includes packets being transferred for at least one first connection, the at least one first connection being a logical path from the first metrics server to one of the plurality of clients outside the intranet;

wherein the performance metrics generated by the first metrics server is for a predetermined measurement time interval using the measured network traffic for the at least one first connection;

a second metrics server that is configured to non-intrusively measure network traffic being transferred in and out of the intranet and to generate performance metrics based on the network traffic measured;

wherein the network traffic measured by the second metrics server includes packets being transferred for at least one second connection, the at least one second connection being a logical path from the second metrics server to one of the plurality of clients outside the intranet;

wherein the performance metrics generated by the second metrics server is for a predetermined measurement time interval using the measured network traffic for the at least one second connection;

wherein the first metrics server distributes performance metrics generated by the first metrics server to the second metrics server in the intranet;

wherein the second metrics server distributes performance metrics generated by the second metrics server to the first metrics server in the intranet;

wherein the performance metrics generated by the first and second metrics servers are distributed on a predetermined periodic basis; and wherein the predetermined periodic basis is one minute after performance metrics have been generated by the first and second metrics servers.

11. A method of providing network performance metrics using an intranet, the intranet having at least one server, the method comprising:

non-intrusively measuring network traffic between at least one server in an intranet and at least one client outside the intranet, the intranet being a network accessible only by authorized users;

generating performance metrics from the network traffic measured between the at least one server and the at least one client within a predetermined measurement time interval;

wherein the non-intrusive measurement of network traffic and the generation of performance metrics are performed by the at least one server;

wherein the non-intrusive measurement of network traffic includes copying packets being transferred between the at least one client and the at least one server to a memory buffer of the at least one server;

further comprising intrusively measuring network traffic between, the at least one server and the at least one client in an intranet;

wherein the intrusive measurement of network traffic includes injecting and monitoring probing packets that are transferred between the at least one server and the at least one client outside the intranet; and further comprising distributing performance metrics generated by the at least one server to another at least one server inside the intranet.

12. A method of providing network performance metrics using an intranet, the intranet having at least one server, the method comprising:

examining packets being transferred during a plurality of connections, such that each connection of the plurality of connections is a logical path between at least one server in the intranet and at least one client outside the intranet, the intranet being a network accessible by authorized users;

generating performance metrics from the examined packets for the plurality of connections upon the expiration of a predetermined measurement time interval;

accumulating performance metrics from the generated performance metrics for the plurality of connections for each of the plurality of connections that remain active beyond the predetermined measurement time interval;

creating a record for each connection of the plurality of connections that are active during a predetermined measurement time interval; and deleting each created record corresponding to each connection of the plurality of connections that becomes inactive when the predetermined measurement time interval expires.

13. The method of generating network performance metrics of claim 12 further comprising distributing performance metrics generated and accumulated upon the expiration of a predetermined measurement time interval.

14. The method of generating network performance metrics of claim 13 further comprising continuing to examine packets and generate, accumulate and distribute performance metrics for a plurality of successive predetermined measurement time intervals.

15. A measurement infrastructure comprising:

a plurality of clients outside an intranet, the intranet being a network accessible only by authorized users;

a first metrics server inside the intranet coupled to the plurality of clients and configured to non-intrusively measure network traffic being transferred in and out of the intranet and to generate performance metrics based on the network traffic measured;

further comprising a second metrics server that is configured to non-intrusively measure network traffic being transferred in and out of the intranet and to generate performance metrics based on the network traffic measured, and the first metrics server distributes performance metrics generated by the first metrics server to the second metrics server and the second metrics server distributes performance metrics generated by the second metrics server to the first metrics server.

16. A method of providing network performance metrics by a plurality of servers in an intranet being accessible only by authorized users, the method comprising:

non-intrusively measuring, by a first server in the intranet, network traffic between the first server and at least one client outside the intranet;

generating performance metrics, by the first server, from the network traffic measured between first server and the at least one client within a predetermined measurement time interval;

intrusively measuring network traffic between the first server and the at least one client outside the intranet, the intrusive measurement including injecting and monitoring probing packets that are transferred between the first server and the at least one client outside the intranet; and distributing performance metrics generated by the first server to a second server inside the intranet.

17. A measurement infrastructure performed by servers inside an intranet, the intranet being a network accessible only by authorized users, comprising:

a first metrics server inside the intranet coupled to the plurality of clients and configured to non-intrusively measure network traffic being transferred in and out of the intranet and to generate performance metrics based on the network traffic measured;

a second metrics server configured to non-intrusively measure network traffic being transferred in and out of the intranet and to generate performance metrics based on the network traffic measured;

wherein the first metrics server is further configured to distribute performance metrics generated by the first metrics server to the second metrics server; and wherein the second metrics server is further configured to distribute performance metrics generated by the second metrics server to the first metrics server.

* * * * *